(12) United States Patent
Stark

(10) Patent No.: US 11,506,953 B2
(45) Date of Patent: Nov. 22, 2022

(54) DOWNHOLE TELEMETRY SYSTEM USING FREQUENCY COMBS

(71) Applicant: Halliburton Energy Services, Inc., Houston, TX (US)

(72) Inventor: Daniel Joshua Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 524 days.

(21) Appl. No.: 16/671,150

(22) Filed: Oct. 31, 2019

(65) Prior Publication Data

US 2020/0064512 A1 Feb. 27, 2020

Related U.S. Application Data

(63) Continuation-in-part of application No. 15/765,672, filed as application No. PCT/US2015/060660 on Nov. 13, 2015, now Pat. No. 10,494,917.

(51) Int. Cl.
*G02F 1/365* (2006.01)
*G02F 1/35* (2006.01)

(52) U.S. Cl.
CPC .............. *G02F 1/365* (2013.01); *G02F 1/35* (2013.01); *G02F 1/353* (2013.01)

(58) Field of Classification Search
CPC ............ G02F 1/35; G02F 1/353; G02F 1/365; G01V 11/002
See application file for complete search history.

(56) References Cited

U.S. PATENT DOCUMENTS

| 725,605 A | 7/1900 | Tesla |
| 3,626,315 A | 12/1971 | Stirling et al. |
| 6,631,019 B1 | 10/2003 | Vujkovic-Cvijin et al. |
| 7,203,402 B2 | 4/2007 | Haensch et al. |
| 7,248,178 B2 | 7/2007 | Layton |

(Continued)

FOREIGN PATENT DOCUMENTS

| EP | 0589683 | 3/1994 |
| EP | 2343840 | 7/2011 |

(Continued)

OTHER PUBLICATIONS

Agrawal, G.P., Fiber-Optic Communication Systems. 2012: Wiley: Chapters 6, 9, and 11.

(Continued)

*Primary Examiner* — Daniel Petkovsek
(74) *Attorney, Agent, or Firm* — Thomas Rooney; C. Tumey Law Group PLLC

(57) ABSTRACT

A method and system for operating a frequency comb. The method may comprise operating an electro-optic (EO) frequency comb with two phase-locked microwave signals to produce an optical output, detecting the optical output with an optical receiver as one or more beat notes, and detecting the one or more beat notes with a radio-frequency spectrum analyzer. The system may comprise an EO frequency comb and an EO phase modulator disposed in the bulk nonlinear crystal resonator. The EO frequency comb may further comprise a continuous-wave laser and a bulk nonlinear crystal resonator connected to the continuous-wave laser.

20 Claims, 10 Drawing Sheets

(56) References Cited

U.S. PATENT DOCUMENTS

| | | | |
|---|---|---|---|
| 7,324,195 | B2 | 1/2008 | Packirisamy et al. |
| 7,696,901 | B2 | 4/2010 | Wilson et al. |
| 7,881,620 | B2 | 2/2011 | Nicholson et al. |
| 7,912,647 | B2 | 3/2011 | DiFoggio |
| 7,982,632 | B2 | 7/2011 | Miller |
| 8,818,207 | B2 | 8/2014 | Tanaka et al. |
| 9,088,371 | B2 | 7/2015 | Witzens |
| 2002/0186435 | A1 | 12/2002 | Shpantzer et al. |
| 2005/0270172 | A1 | 12/2005 | Bailey et al. |
| 2006/0102347 | A1 | 5/2006 | Smith |
| 2007/0166048 | A1 | 7/2007 | Doerr et al. |
| 2011/0097083 | A1 | 4/2011 | Barrett |
| 2013/0177316 | A1 | 7/2013 | Cardakli |
| 2013/0202303 | A1 | 8/2013 | Wilkinson et al. |
| 2015/0315905 | A1 | 11/2015 | Xu et al. |
| 2018/0313974 | A1 * | 11/2018 | Barfoot .......... G01V 8/24 |
| 2021/0096444 | A1 * | 4/2021 | Zhang .......... G02F 1/3536 |

FOREIGN PATENT DOCUMENTS

| | | | |
|---|---|---|---|
| WO | 2008118931 | 10/2008 | |
| WO | 2009048821 | 4/2009 | |
| WO | WO-2019213137 A1 * | 11/2019 | .......... G02F 1/3536 |
| WO | WO-2020207360 A1 * | 10/2020 | .......... G02F 1/0136 |

OTHER PUBLICATIONS

Sklar, B., Digital communications: fundamentals and applications. 3 ed. 2001, Cahpters 9, 11, 12, 15, and 16: Prentice-Hall PTR. Available at https://www.pearson.com/us/higher-education/program/Sklar-Digital-Communications-Fundamentals-and-Applications-2nd-Edition/PGM127356.html.

N. Alic, "Frequency Combs in Telecommunications Applications," in Frontiers in Optics 2014, OSA Technical Digest (online) (Optical Society of America, 2014), paper FM3C.6.

CoilComm, Halliburton, 2012, available at https://www.halliburton.com/en-US/ps/production-solutions/well-intervention/coiled-tubing/coilcomm-monitoring-service.html.

Future 'Comb on a Chip': NIST's Compact Frequency Comb Could Go Places, National Labs, Oct. 25, 2011, available at https://www.nist.gov/news-events/news/2011/10/future-comb-chip-nists-compact-frequency-comb-could-go-places.

"Coherent terabit communications with microresonator Kerr frequency combs" Pfeifle et al. Published Apr. 12, 2014.

"Optical frequency comb technology for ultra-broadband radio-frequency photonics" Victor Torres-Company published Dec. 18, 2013.

"Operating Principle of the WDM technology" Xens Dated 2014.

"Optical frequency comb generation from a monolithic microresonator" Del'Haye et al. Pubished Dec. 20, 2007.

"CMOS-compatible multiple-wavelength oscillator for on-chip optical interconnects" Levy et al. Published Dec. 20, 2009.

"Fully integrated, Multiport, Planar-waveguide, Spectral Comparators and Multiplexers based on Lithographic Holography" Mossberg et al. dated Aug. 31, 2005.

"Submicron planar waveguide diffractive photonics" Mossberg et al. dated 2005.

"Non-reciprocal Brillouin scattering induced transparency" Kim et al. Published Jan. 26, 2015.

"26 Tbit s-1 line-rate super-channel transmission utilizing all-optical fast Fourier transform processing" Killerkuss et al. Published May 22, 2011.

"A New Class of Spreading Waveforms for Cdma" White et al. published Nov. 29, 1992.

International Search Report and Written Opinion for PCT/US2015/060660 dated Aug. 12, 2016.

Monolithic Frequency Comb Generators, University Work, available at https://www.epfl.ch/labs/k-lab/latest_scientific_results_2/page-65028-en-html/ [retrieved on Mar. 23, 2021].

Dr. Tatjana Curcic, Quantum-Assisted Sensing and Readout (QuASAR) (Archived), DAPRA Defense Project, available at https://www.darpa.mil/program/quantum-assisted-sensing-and-readout [retrieved Mar. 29, 2021].

* cited by examiner

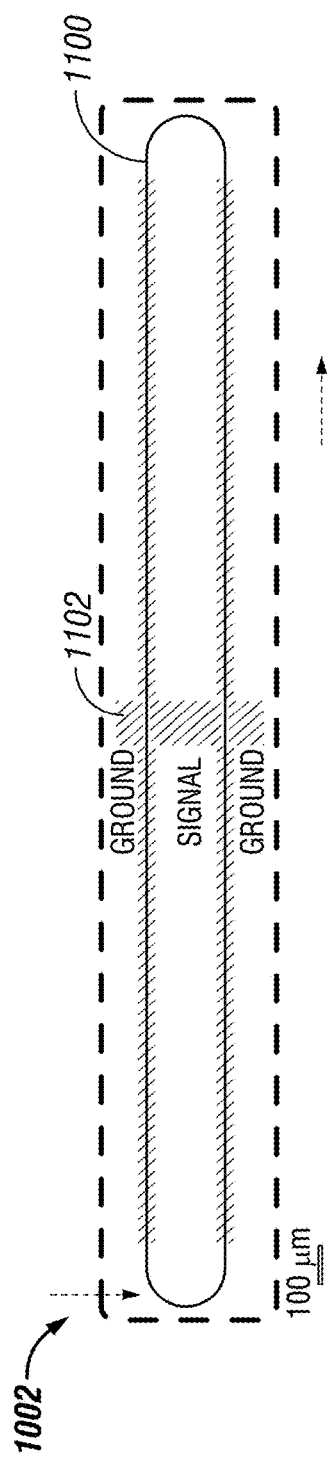
FIG. 11
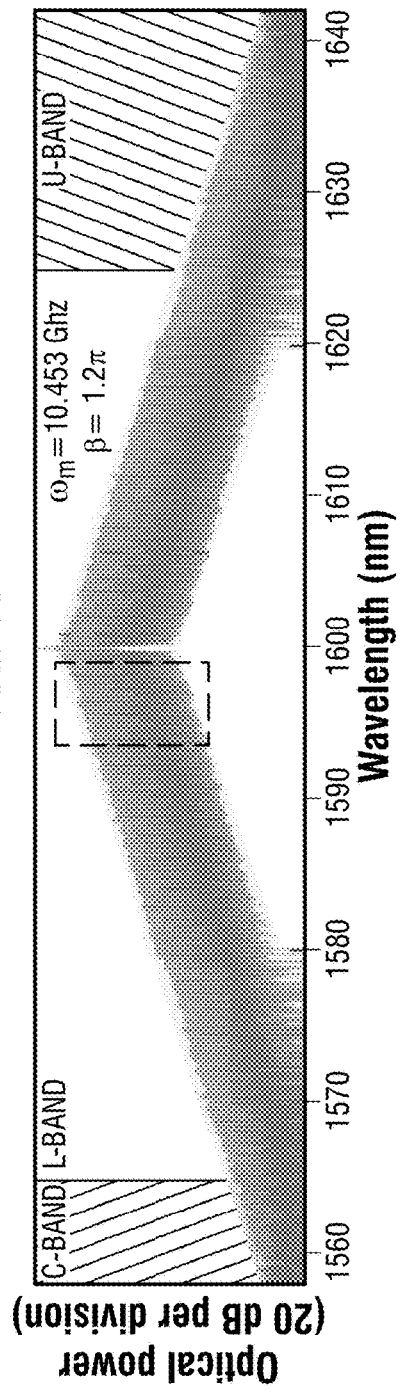
FIG. 12A
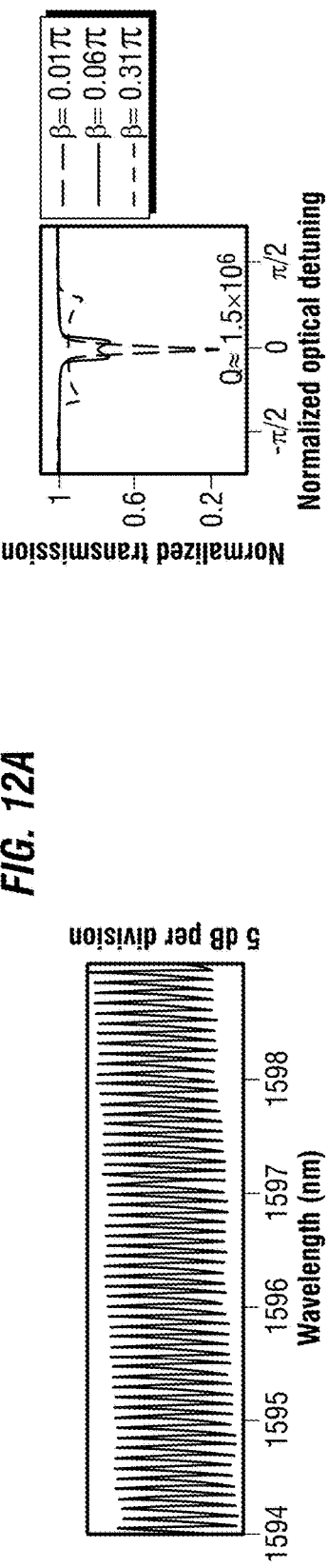
FIG. 12B
FIG. 12C

DOWNHOLE TELEMETRY SYSTEM USING FREQUENCY COMBS

RELATED APPLICATIONS

This application is a continuation-in-part of U.S. patent application Ser. No. 15/765,672, filed Nov. 13, 2015, issued Dec. 3, 2019, as U.S. Pat. No. 10,494,917 B2 which is incorporated herein by reference in its entirety.

BACKGROUND

The present disclosure relates to a system and method for increasing the reliability and transmission data-rate of downhole optical fiber telemetry to the surface. More particularly, the present disclosure relates generally to transmitting large amounts of data using frequency combs.

As downhole operations obtain ever greater amounts of data for efficient and thorough job completion, optical fiber telemetry is being implemented in an ever-increasing number of products to provide higher data rate transmission of information and data. Currently, the use of optical fiber telemetry may encounter interference and fading effects as data is transmitted over long distances. Fiber optic communication in downhole applications have also traditionally been limited to single wavelengths. This may make optical fiber telemetry in a wellbore difficult and expensive to perform. Furthermore, interference and fading effects may corrupt and/or lose data, which may prevent operators from recording and identifying all downhole conditions.

BRIEF DESCRIPTION OF THE DRAWINGS

These drawings illustrate certain aspects of some of the examples of the present invention and should not be used to limit or define the invention.

FIG. 11 is an example of a micrograph of a fabricated lithium niobite microring resonator;
FIG. 12A is a graph of a measured output spectrum of the electro-optic comb generator;
FIG. 12B is a graph of one or more comb lines;
FIG. 12C is a graph of a measured transmission spectrum.

DETAILED DESCRIPTION

Figure 1:
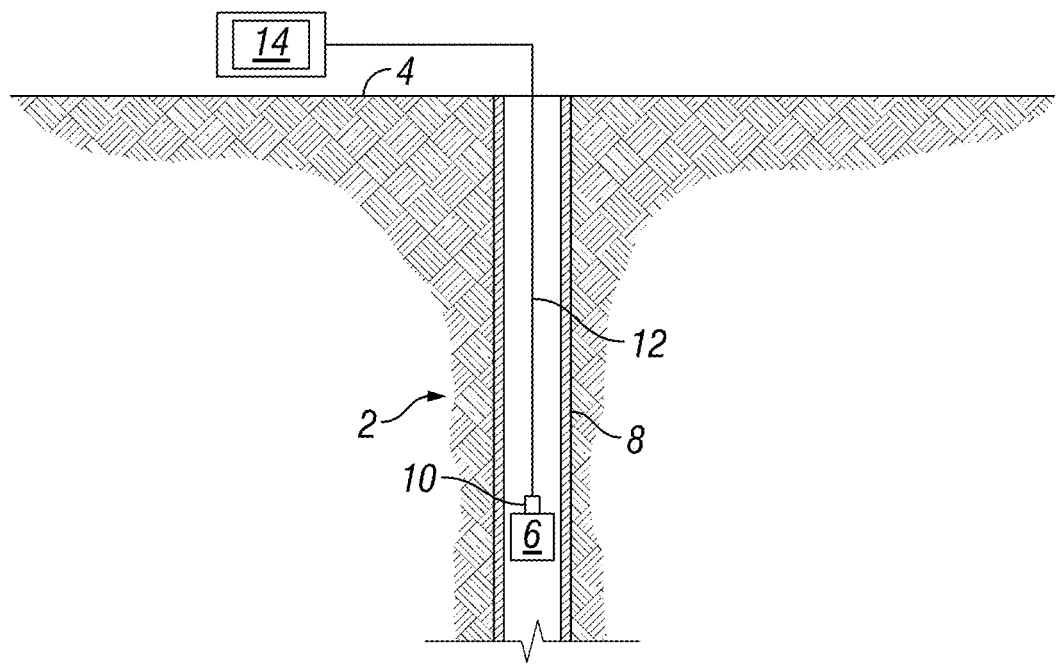
FIG. 1 is an example of a downhole telemetry system.

The present disclosure relates generally to a system and method for increasing the reliability and data-rate transmission of information from a downhole device to the surface and from the surface to the downhole device. More particularly, a system and method using frequency combs may be provided. The disclosure describes a system and method for increasing data rates, for reducing interference, and for reducing transmission fading effects by providing a coherent light source with narrow and well-defined spectral lines that span a broad spectral range, and a mechanism to modulate the individual spectral lines using a frequency comb. In an optical fiber telemetry system, light propagating in optical fibers may be used for carrying information from a transmitter to a receiver. Traditionally, the optical linewidth of light in fiber optic communication is broad, which may limit data transmission to fewer than one hundred and sixty channels. For example, ultra-dense wavelength division multiplexing may only allow eight channels. By increasing the number of channels, transmission of data up to one terabit per second may be possible. Without limitation, this may be accomplished using a frequency comb transmitter integrated with a wavelength division multiplexing modulation system.

Certain examples of the present disclosure may be implemented at least in part with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In certain examples, the present disclosure may use fiber optics. Fiber optic cables may be used to transmit light for communications and optical sensing. For example, in optical sensing, light may be used to acquire various signal types, such as temperature, pressure, strain, acceleration, chemical spectral signatures and the like. Optical sensing may be used in a wellbore by communicating light between a source and downhole sensors or actuators (or both). The fiber optic cables may be embedded in the wellbores casing and/or run down into the wellbore with a well tool (e.g., a logging tool string in a drill pipe string). Fiber optics may allow for a large amount of data to be transmitted over distance quickly and completely.

A downhole telemetry system may comprise an information handling system, a frequency comb transmitter, a frequency comb receiver, fiber optic cables, and any other optics necessary to filter, amplify, attenuate, split, combine, frequency shift, rotate polarization of, adjust phase of, or in any other way condition light. The frequency comb transmitter may further comprise a laser source, a frequency comb, a wavelength division multiplexer, modulator, and encoding schemes. The frequency comb receiver may comprise an optical modulation analyzer and a wavelength division demultiplexer. The information handling system may be connected to the frequency comb transmitter and/or the frequency comb receiver for sending and analyzing information and data. The downhole telemetry system may allow for large amounts of information to be transmitted across large distances and at a high rate of speed.

Accordingly, this disclosure describes methods and systems which may be used for transmitting information in well operations. A method for transmitting information in well operations may comprise splitting a coherent light into a plurality of wavelengths with a demultiplexer within a fiber comb transmitter and encoding information onto at least one of the plurality of wavelengths within the fiber comb transmitter. The method may also comprise combining the plurality of wavelengths into a second coherent light with a wavelength division multiplexer within the fiber comb transmitter and broadcasting the second coherent light from the frequency comb transmitter. In examples, the frequency comb transmitter may comprise a modulator. The modulator may comprise the wavelength division multiplexer, an encoder, and the demultiplexer. Additionally, the frequency comb transmitter may be disposed on a surface of a wellbore and the frequency comb receiver may be disposed within the wellbore. The frequency comb transmitter and the frequency comb receiver may be connected by at least one fiber optic cable.

In examples, the frequency comb receiver may be disposed on a surface of a wellbore and the frequency comb transmitter may be disposed within the wellbore. The frequency comb receiver and the frequency comb transmitter may be connected by at least one fiber optic cable. Additionally, components of the frequency comb transmitter may be disposed in different locations. For example, the laser source and frequency comb may be disposed on a surface of a wellbore, a modulator may be disposed in the wellbore, and the frequency comb receiver may be disposed on the surface. Further, the frequency comb transmitter may be attached to a device that detects energy waves, properties of the wellbore, and properties of the surrounding environment. The device may process information sent by energy waves and may also direct the information to the frequency comb transmitter. The frequency comb transmitter may broadcast the information on the coherent light through the fiber optic cable, which may be received by the frequency comb receiver in the wellbore. The modulator may further comprise the demultiplexer, an encoder, and the wavelength division multiplexer.

In additional examples, the frequency comb transmitter and the frequency comb receiver may be disposed in a wellbore. The frequency comb transmitter may be attached to a device that detects energy waves, properties of the wellbore, and properties of the surrounding environment. The device may process information sent by energy waves and may further direct the information to the frequency comb transmitter. The frequency comb transmitter may broadcast the information on the coherent light through the fiber optic cable, where it may be received by the frequency comb receiver in the wellbore.

The method for transmitting information in well operations, in additional examples, may further comprise broadcasting the coherent light from the frequency comb transmitter on the surface to a downhole device and broadcasting the coherent light from the frequency comb transmitter on the downhole device to the surface of a wellbore.

A downhole telemetry system may comprise a frequency comb transmitter, a fiber optic cable, and a frequency comb receiver. The frequency comb transmitter may further comprise a laser source and a modulator. The modulator may also comprise a demultiplexer, an encoder, and a wavelength division multiplexer. In examples, the frequency comb transmitter may be disposed on a surface of the wellbore and the frequency comb receiver may be disposed in the wellbore. The frequency comb transmitter and frequency comb receiver may also be connected by the fiber optic cable. The frequency comb transmitter may be attached to a device that may be sensitive to energy waves, properties of the wellbore, and properties of the surrounding environment. The device may be configured to process information sent by energy waves and direct the information to the frequency comb transmitter. The frequency comb transmitter may be configured to broadcast the information on coherent light through the fiber optic cable and the information may be received by the frequency comb receiver in the wellbore.

In examples, components of the frequency comb transmitter may be disposed at different locations. The laser source may be disposed on a surface of the wellbore and the modulator may be disposed in the wellbore. The fiber optic cable may connect the laser source and the modulator. The frequency comb receiver may also be disposed on the surface and may be connected to the modulator by a second fiber optic cable. The frequency comb transmitter may be attached to a device that may be sensitive to energy waves, properties of the wellbore, and properties of the surrounding environment. The device may be configured to process information sent by energy waves and direct the information to the frequency comb transmitter. The frequency comb transmitter may be configured to broadcast the information on coherent light through the fiber optic cable and the information may be received by the frequency comb receiver in the wellbore. Additionally, the modulator may be attached to a downhole device.

In additional examples, the frequency comb transmitter may be disposed in a wellbore and the fiber comb receiver may be disposed on the surface of the wellbore. The frequency comb transmitter and the frequency comb receiver may be connected to the fiber optic cable. Additionally, the frequency comb transmitter may be disposed on a downhole device and the downhole device may provide information for transmission to the frequency comb transmitter and to the frequency comb receiver on the surface for analyses.

In further examples, the frequency comb transmitter and the frequency comb receiver may be disposed within a wellbore. The frequency comb transmitter may be attached to a device that may be sensitive to energy waves, properties of the wellbore, and properties of the surrounding environment. The device may be configured to process information sent by energy waves and direct the information to the frequency comb transmitter. The frequency comb transmitter may be configured to broadcast the information on coherent light through the fiber optic cable and the information may be received by the frequency comb receiver in the wellbore. The frequency comb transmitter and the frequency comb receiver may be attached by at least two fiber optic cables. Additionally, the frequency comb transmitter may be attached to a downhole device.

FIG. 1 illustrates an example of a downhole telemetry system 2 for transmitting data to a surface 4 from a downhole device 6. In examples, downhole device 6 may be disposed at any depth within wellbore 8. While not illustrated, wellbore 8 may be cased or uncased. As illustrated, a frequency comb transmitter 10 may be disposed on downhole device 6. Frequency comb transmitter 10 may be disposed at any suitable location on and/or within downhole device 6. For example, frequency comb transmitter 10 may be disposed on the outside surface of downhole device 6. More specifically, on a top surface, a bottom surface, and/or a side surface of downhole device 6. Still further, frequency comb transmitter 10 may be disposed within downhole device 6. In examples, frequency comb transmitter 10 may be disposed within downhole device 6 at a top, at a bottom, and/or between the top and bottom within downhole device 6. Frequency comb transmitter 10 may take data and information recorded and/or received by downhole device 6 and transmit it through fiber optic cable 12 to frequency comb receiver 14.

Downhole device 6 may include any of a variety of devices that may be disposed in wellbore 8 for well operations. By way of example, downhole device 6 may be logging tool, which may include a casing collar locator, a gamma ray tool, and/or sensors (e.g., a pressure sensor, temperature sensor, etc.). Other types of devices may include bottomhole assemblies, permanent sensor box installations, artificial list systems, subsea installations, or sensor systems on pigs, darts, and/or plugs.

While not illustrated, any of a variety of suitable means may be used for conveyance of downhole device 6 into wellbore 8. In some examples, the downhole device 6 may be conveyed into wellbore 8 using coiled tubing (e.g., a substantially continuous tubular string, typically stored on a reel) and/or a wireline. However, the scope of this disclosure is not limited to any particular form of the conveyance of downhole device 6 into wellbore 8. Furthermore, it may be installed permanently in the wellbore, such as behind casing.

Figure 2:
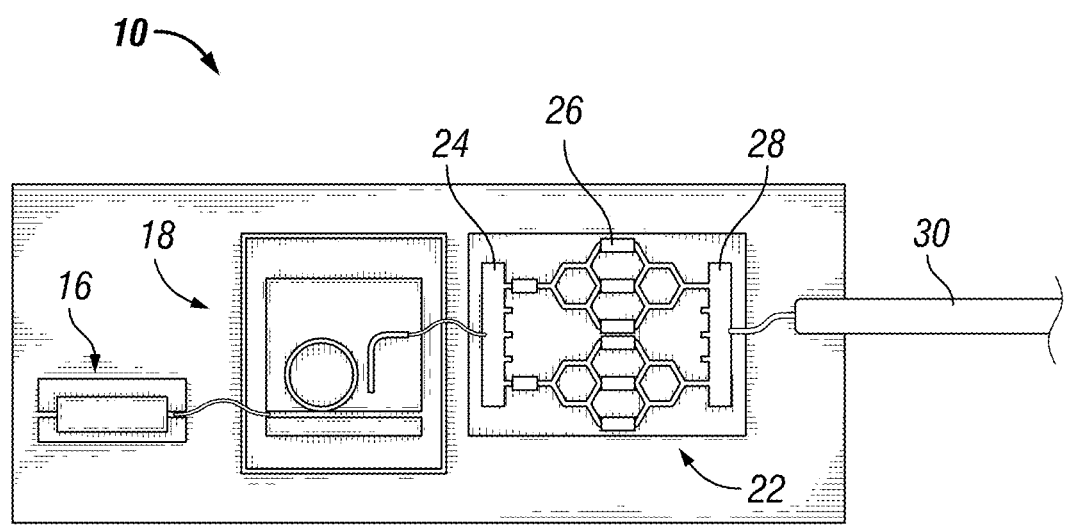
FIG. 2 is an example of a frequency comb transmitter.

FIG. 2 illustrates an example of a frequency comb transmitter 10. Without limitation, frequency comb transmitter 10 may be a field-able monolithographically integrated frequency comb transmitter. However, while FIG. 2 may illustrate frequency comb transmitter 10 in the form of a field-able monolithographically integrated frequency comb transmitter, the scope of the disclosure is not limited to any particular form of frequency comb transmitter 10. Frequency comb transmitter 10 may comprise a laser source 16, a frequency comb 18, and at least one optical modulator 22. Laser source 16 may be disposed within frequency comb transmitter 10 at any suitable location. A suitable location may be, but is not limited to, within a top, a bottom, and/or between the top and bottom of frequency comb transmitter 10. In examples, laser source 16 may provide a carrier offset frequency from which all wavelengths, which may carry data during transmission, may be generated. Laser source 16 may comprise any of a variety of suitable laser sources, including, but not limited to, a pump laser, titanium-sapphire laser, fiber laser, narrow-band vertical cavity surface emitting laser, narrow-band quantum dot laser, a cavity laser, and/or the like. Additionally, the carrier offset frequency, $f_o$, may correspond to a frequency less than the comb teeth spacing, ranging from 0 Hz to 800 THz. Specifically, frequencies of 193.4 THz (wavelength of 1550 nanometers) and/or 228.8 THz (wavelength of 1310 nanometers) may be selected for their low-absorption characteristics in fiber. The carrier offset frequency generated by laser source 16 may be transferred to frequency comb 18.

Figure 3:
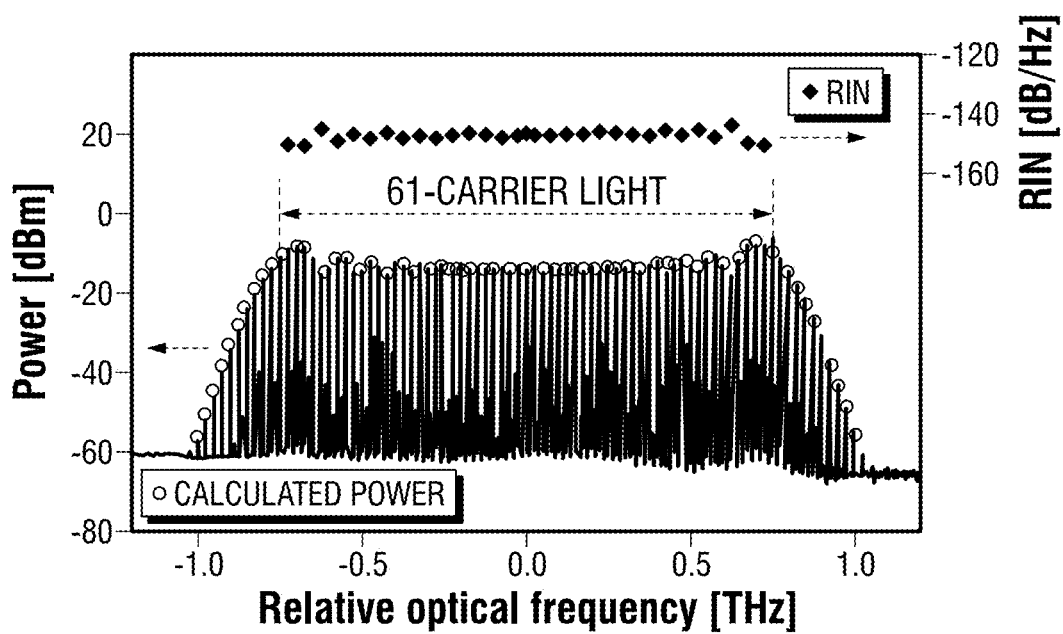
FIG. 3 is a graph illustrating a possible number of accessible carrier lights.

Frequency comb 18 may take the carrier offset frequency from laser source 16 and generate mode locked light pulses at precise time intervals providing well defined frequency separations from the carrier offset frequencies. Frequency separations may be described as $f(n)=f_o+nf_r$, where n may be the mode and $f_r$ may be the mode separation, otherwise known as the comb tooth spacing, the repetition rate (for mode locked lasers), or the AM frequency. Mode separations may range from the order of 10 s MHz to 100 THz, which may lead up to approximately fifteen hundred "teeth" in a single typical frequency comb 18. Referring to FIG. 3, each tooth may be made available to carry information and/or data. FIG. 3 illustrates the number of teeth that may be created and used by an exemplary frequency comb 18. The graph in FIG. 3 illustrates sixty-one different frequencies, "teeth" or carrier lights, which may be used to carry information and/or data. Teeth, in FIG. 3, that may be used to carry information and/or data may all comprise about the same amount of power and range across a relative optical frequency. The range of the frequency may allow frequency comb 18 to incorporate as many teeth as possible, but typically spans at least one octave. A single frequency comb 18 may be generated using, without limitation, micro resonators, electro-optic generators, flat-top frequency generators, parametric generators, CW laser injection locking, mode-locked lasers in a cavity, four-wave mixing, electronics generate a pulse sequence, and the like. In examples, micro resonators and electro-optic generators may be the most robust option for frequency comb 18 generation, as they may be monolighographically integrated with other optical components, minimizing size and mitigating material failure of interconnects in harsh environments. Each individually separated frequency from a wavelength may have information and data encoded to individual frequency through modulators 22.

Modulator 22 may be disposed within frequency comb transmitter 10 at any suitable location. A suitable location may be, but is not limited to, within a top, a bottom, and/or between the top and bottom of frequency comb transmitter 10. Modulator 22 may attach to frequency comb 18 and encode information onto wavelengths transmitted from frequency comb 18 to modulator 22. Without limitation, modulator 22 may comprise a wavelength division multiplexer 24, encoders 26, and a demultiplexer 28. Other optical components that modify the amplitude, phase, frequency, polarization, or wavenumber of one or more "teeth" may also be utilized in modulator 22. Modulator 22 may encode data onto individual frequencies of a wavelength, which may also be referred to as "channels." The frequencies may be encoded with phase information using electro-optic based phase modulators and/or fiber stretches. Alternatively, the channel may be encoded with amplitude modulation using electro-optic based amplitude modulators, semiconductor optical amplifiers, electroabsorption modulators, and/or fiber attenuators. The channel may also be encoded with information by modifying the polarization state through modification of the strain state of the light waveguide or through use of the Faraday Effect, the magneto-optic Kerr effect, or some other magneto-optic effect. Additionally, lithographically patterned devices may be used as a modulator and/or may be used in series within modulator 22. Modulator 22 may take coherent light from frequency comb 18 and split the coherent light into different wavelengths using demultiplexer 28. Without limitation, demultiplexer 28 may be the first component in which the coherent light may be manipulated within modulator 22. Demultiplexer 28 may be comprised of a single mode fused taper coupler, grating demultiplexers, interferometers, micro-optic based filter, metamaterial-based filter, and/or tunable filters. Specifically, demultiplexer 28 may comprise Tunable Optical Filters such as Fabry-Perot Filters, Mach-Zehnder Filters, Grating-Based Filters, Acousto-Optic Filters, and Amplifier-Based Filters. Additionally, demultiplexers 28 may be specifically grating-based demultiplexers, arrayed-waveguide gratings and/or phased-array demultiplexers, and/or planar waveguides. Demultiplexer 28 may be composed of a free-standing, but supported, component or be integrated into a larger photonic-integrated-circuit or monolithographic system. Demultiplexer 28 may separate the light into different wavelengths, preparing the wavelengths for encoding within modulator 22 using encoder 26.

Encoders 26 may allow for a variety of different encoding schemes. Encodings schemes may encode information and data on individual wavelengths, which may be transmitted to a receiver. Encoding schemes may comprise amplitude-shift keying, phase-shift keying, frequency shift keying, orthogonal frequency-division multiplexing, pulse-amplitude modulation, quadrature amplitude modulation, and/or the like. Encoding schemes chosen may lead to a different number of bits that may be encoded into the data stream, which may be chosen to mitigate an optical limitation; for example, using phase-shift keying for systems with uncontrollable amplitude modulations. Additionally, each frequency may be encoded separately. By taking advantage of repetition rates that may reach greater than 10 s GHz, distinct frequencies may be utilized to transmit data, which may be useful for optical wave form syntheses and/or choosing a frequency with the highest stability and/or signal-to-nose ratios to send data. High repetition rates may allow for data to be spread across multiple frequencies, using a variation of spread-spectrum communication similar to a code-division multiple access. The data may be encoded on different frequencies randomly and/or pseudo-randomly, but the encoded will be on known and distinct frequencies. An equivalent sequence of frequencies may then be sampled, and the data stream reconstructed from individual pieces of data. However, data may become corrupted and/or lost as the coherent light traverses fiber optic cable 12. Outside stimulus, movement of fiber optic cable 12, reflections, and manufacturing deficiencies within fiber optic cable 12 may lead to interference and channel fading. Without limitation, wavelength hoping may be useful for mitigating interferences and/or greater attenuation, due to channel fading, which may occur in long stretches of optical fiber. Additionally, by spreading out the data signal among many frequencies, only a few bits of data for any byte may be corrupted due to transmission on a bad channel. The data may then be corrected using techniques such as forward error correction or any other error correction technique. A spread-spectrum technique may be expanded through optically, which may allow frequencies to transmit sets of data that overlap but may be orthogonal to each other and at a different phase. These techniques of encoding data may help in preventing the loss and/or corruption of encoded data. They may also allow more bits per symbol of data to be transmitted. After encoding frequencies with data and information, modulator 22 may combine the frequencies into a single beam of coherent light through wavelength division multiplexer 24

Wavelength division multiplexer 24 may combine wavelengths encoded with data into a single source of coherent light. Located within modulator 22, wavelength division multiplexer 24 may comprise, without limitation, grating mutliplexers, fiber couplers, star couplers, directional couplers, couplers with Mach-Zehnder interferometers, fused biconical tapers, add-drop multiplexers, planar wave guides, monolithographic multiplexers, and/or combinations thereof. Once combined, the single source of coherent light may be transmitted out transmitter 30 and into fiber optic cable 12. The coherent light, with encoded data may traverse a single fiber optic cable 12 to frequency comb receiver 14. In other examples, coherent light may be transmitted from transmitter 30 into two and/or more fiber optic cables 12. Information and data transmitted through two or more fiber optic cables 12 may be verified, removing duplications, before analyses within an information handling system. In examples, fiber optic cable 12 may run for feet and/or miles before attaching to frequency comb receiver 14.

Frequency comb receiver 14, as illustrated in FIG. 1, may be dispose on the surface, above wellbore 8. Without limitation, frequency comb receiver 14 may comprise an optical modulation analyzer. An optical modulation analyzer may use an optical bandpass filter and a local oscillator to select wavelengths to be demodulated. Optical modulation analyzer may also employ fast Fourier and inverse fast Fourier transforms to decode data encoded in a frequency domain. Additionally, grating with photodetectors may be used to help speed decoding as well as inline broadband fiber amplifiers, lithographic-based wavelength division multiplexers, optical transmission encoding schemes, narrow-band filters, secondary frequency combs, and/or the like. Frequency comb transmitter 10 may transmit data and information, within light, from wellbore 8 through fiber optic cable 12 to frequency comb receiver 14 on surface 4. However, the components of frequency comb transmitter 10 may be separated into different modules and disposed in different locations.

FIG. 1 illustrates an example of downhole telemetry system 2 in which information and data may be transmitted from a downhole device 6 to the surface 4. Frequency comb transmitter 10 may encode and send data using light, which may traverse frequency optic cable 12 to frequency comb receiver 14. It should be understood that the present invention should be not limited to the particular configuration of FIG. 1. For example, frequency comb transmitter 10 and frequency comb receiver 14 may be disposed at different locations.

Figure 4:
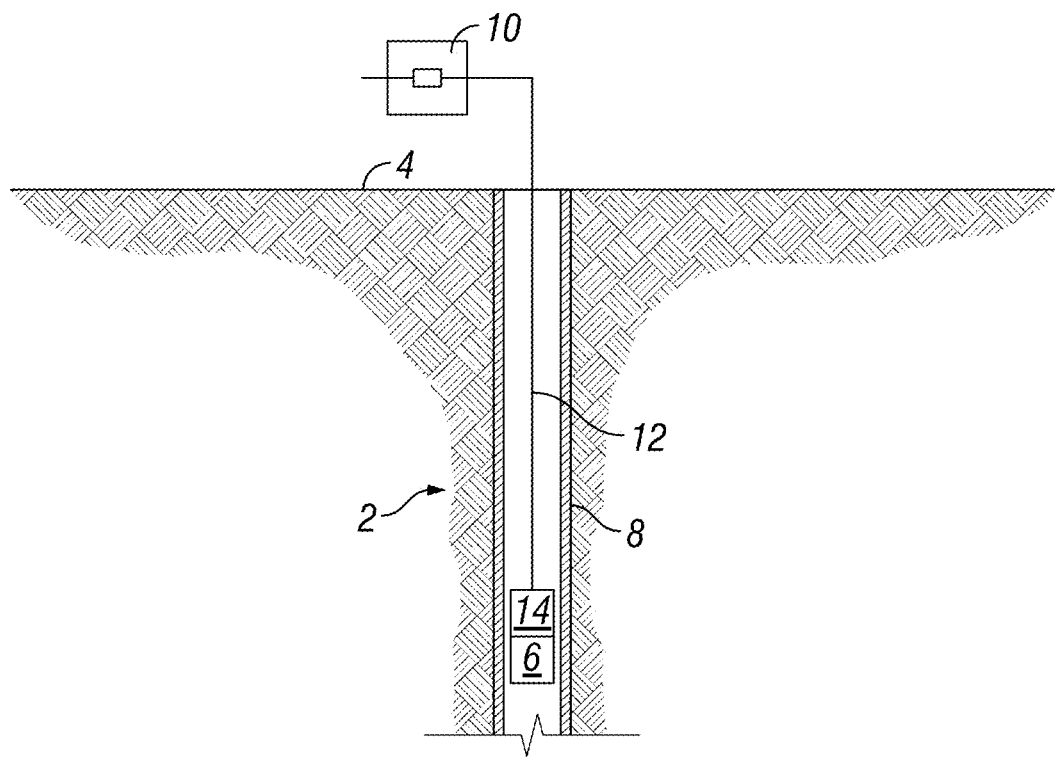
FIG. 4 is another example of a downhole telemetry system.

Referring now to FIG. 4, an example of downhole telemetry system 2 that include frequency comb transmitter 10 located at the surface 4 while frequency comb receiver 14 may be located in the wellbore 8. In these examples, information and data, such as command and directional information, may be encoded by frequency comb transmitter 10 on surface 4. The information may be transmitted by frequency comb transmitter 10 by light, which may traverse frequency optic cable 12 and be received by frequency comb receiver 14. Frequency comb receiver 14 may then read the data encoded on the light. The information and data may then be distributed to downhole device 6, which may perform the desired function transmitted from operators on surface 4.

Figure 5:
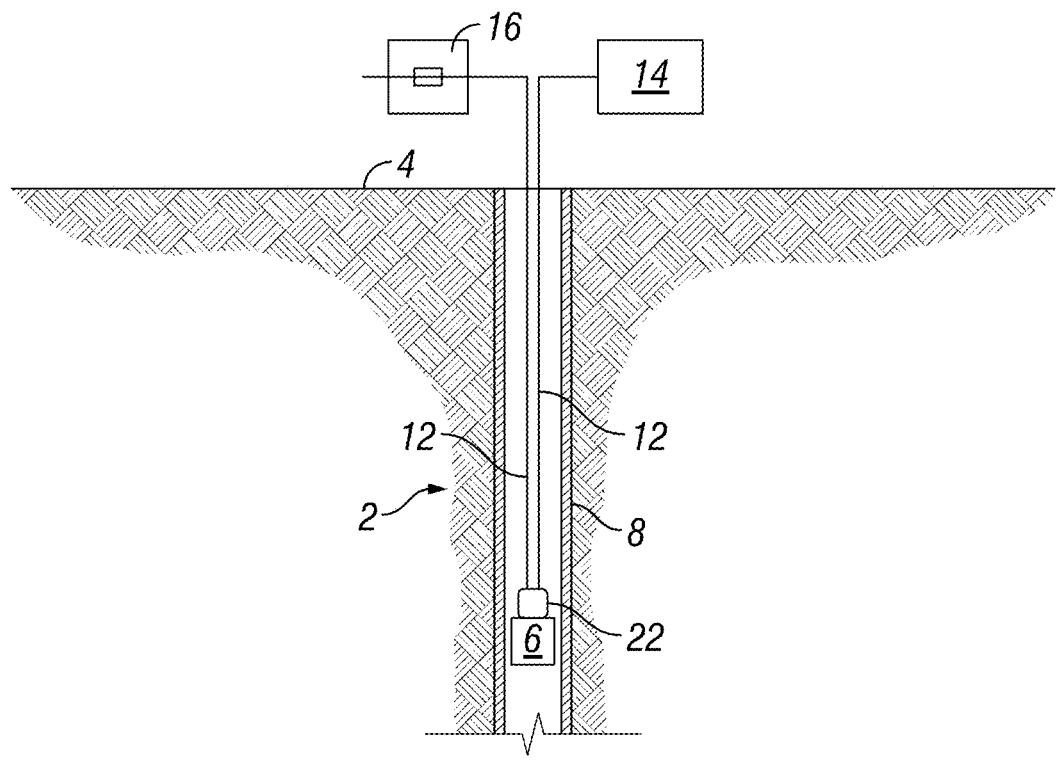
FIG. 5 is another example of a downhole telemetry system.

FIG. 5 illustrates another example of downhole telemetry system 2 in which components of frequency comb transmitter 10 may be disposed in separate locations. As illustrated, modulator 22 may be disposed in the wellbore 8 while laser source 16 may be disposed at surface 4. Specifically, modulator 22 may be disposed on downhole device 6. Modulator 22 may be disposed at any suitable location on and/or within downhole device 6. For example, modulator 22 may be disposed on the outside surface of downhole device 6. More specifically, on a top surface, a bottom surface, and/or a side surface of downhole device 6. Still further, modulator 22 may be disposed within downhole device 6. In examples, modulator 22 may be disposed within downhole device 6 at a top, at a bottom, and/or between the top and bottom within downhole device 6. Coherent light may be emitted from laser source 16, which may be disposed on surface 4. Additionally, coherent light may traverse fiber optic cable 12 and be received by modulator 22, which may be disposed on downhole device 6. Modulator 22 may encode information and data from downhole device 6, as described above, on to the coherent light. Coherent light, with encoded information and data, may traverse a second, or the same, fiber optic cable 12 and may be received by frequency comb receiver 14, which may be located at surface 4. Frequency comb receiver 14 may decode the information and data encoded on the light for analysis by operators on surface 4.

Figure 6:
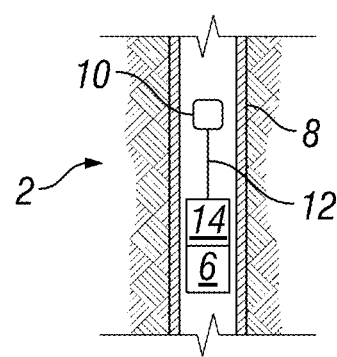
FIG. 6 is another example of a downhole telemetry system.

Additionally, FIG. 6 illustrates another example of downhole telemetry system 2 in which frequency comb transmitter 10 and frequency comb receiver 14 may be disposed within wellbore 8. As illustrated, frequency comb transmitter 10 may be disposed and/or suspended within wellbore 8. Without limitation, frequency comb transmitter 10 may attach to a device that receivers and deciphers pressure waves, optical waves, sound waves, temperatures, strains, chemical compositions, and/or the like. Information and data transmitted may then be transferred to frequency comb transmitter 10. Frequency comb transmitter 10 may then encode the information and/or data, as described above, and transmit the data by light through fiber optic cable 12. The light may be received by frequency comb receiver 14, which may decode the information and/or data stored on the light, as described above. Frequency comb receiver 14 may then decode the data and information encoded on the light. The information and data may then be distributed to downhole device 6, which may perform the desired function transmitted from operators on surface 4.

Figure 7:
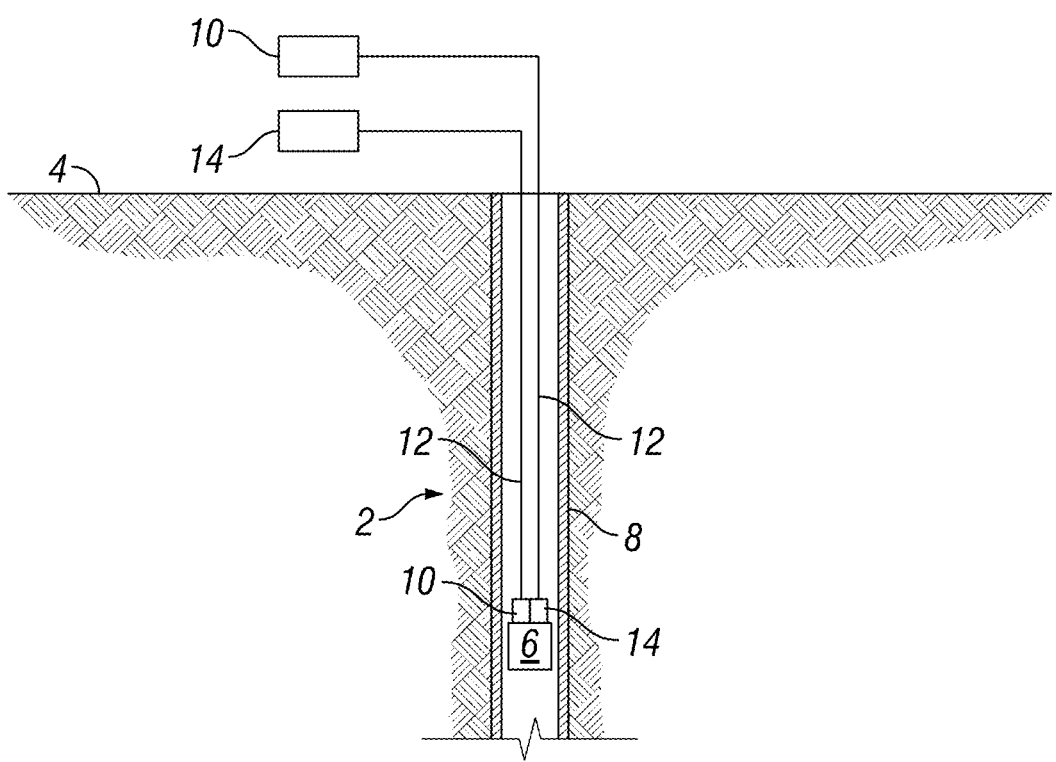
FIG. 7 is another example of a downhole telemetry system.

FIG. 7 illustrates an example of a downhole telemetry system 2 in which may comprise at least two frequency comb transmitters 10 and at least two frequency comb receivers 14. In examples, frequency comb transmitter 10 may be located at the surface 4 while frequency comb receiver 14 may be located in the wellbore 8. Information and data, such as command and directional information, may be encoded by frequency comb transmitter 10 on surface 4. The information may be transmitted by frequency comb transmitter 10 by light, which may traverse frequency optic cable 12 and be received by frequency comb receiver 14. Frequency comb receiver 14 may then read the data encoded on the light. The information and data may then be distributed to downhole device 6, which may perform the desired function transmitted from operators on surface 4. Additionally, information and data from downhole device 6 may be transmitted from downhole device 6 to the surface 4. Frequency comb transmitter 10 may encode and send data using light, which may traverse frequency optic cable 12 to frequency comb receiver 14 on surface 4. The information and data may be decoded and analyzed by operators on surface 4.

Frequency comb 18 (e.g., referring to FIG. 2) includes equally spaced discrete optical frequency components that may operate and function for optical communication, precision metrology, timing and spectroscopy. Currently, frequency combs 18 with wide spectra may be generated by mode locked lasers or dispersion-engineered resonators with third-order Kerr nonlinearity. An alternative method of frequency comb production uses electro-optic (EO) phase modulation in a resonator with strong second-order nonlinearity, resulting in frequency combs 18 with excellent stability and controllability. Previous EO frequency combs, however, have been limited to narrow widths by a weak EO interaction strength and a lack of dispersion engineering in free-space systems. An integrated EO frequency comb generator in a thin-film lithium niobate photonic platform overcome previous EO frequency combs. In examples, the integrated EO frequency comb may feature a large EO response, ultralow optical loss and highly colocalized microwave and optical fields, while enabling dispersion engineering. An EO frequency comb spans more frequencies than the entire telecommunications L-band (over 900 comb lines spaced about 10 gigahertz apart), which may be improved by octave-spanning combs. Furthermore, the high tolerance of the frequency comb generator to modulation frequency detuning, with frequency spacing finely controllable over seven orders of magnitude (on the order of 10 hertz to the order of 100 megahertz), which may generate dual-frequency combs in a single resonator. This may allow integrated EO frequency comb generators to generate wide and stable comb spectra, which may be utilized in spectroscopy operations to optical communications.

The migration of optical frequency comb generators to integrated devices may produce efficient, compact, robust, and high-repetition-rate combs. Currently, almost all on-chip frequency comb generators rely on the Kerr (third order, $\chi(3)$) nonlinear optical process, in which a continuous-wave laser source excites a low-loss optical microresonator having a large Kerr nonlinear coefficient. This approach has enabled demonstration of wide-spanning Kerr frequency combs from the near- to mid-infrared portions of the spectrum in many material platforms, such as silicon, silicon dioxide, silicon nitride and magnesium fluoride. Owing to the complex nature of the parametric oscillation process, sophisticated control protocols are typically required to keep Kerr combs stabilized. An alternative frequency-comb-generation method uses the EO effect in materials with second order ($\chi(2)$) nonlinearity. Conventionally, EO frequency comb generators pass a continuous-wave laser through a sequence of discrete phase and amplitude modulators. Such EO frequency comb generators may feature plentiful frequency comb power and flat spectra and may support flexible frequency spacing.

Figure 9:
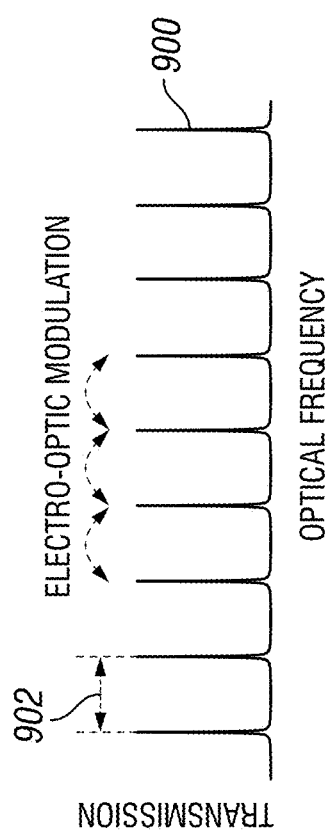
FIG. 9 is an output of the electro-optic comb generator.
Figure 8:
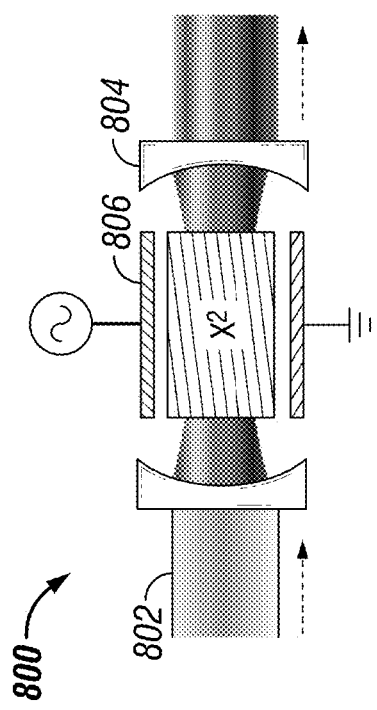
FIG. 8 is an example of an electro-optic comb generator.

In examples, EO frequency comb generators may have a narrow frequency span, however, comprising only tens of lines and spanning only a few nanometers. Therefore, highly nonlinear fiber may be utilized to broaden the frequency comb spectrum further, increasing the system complexity and size. Broader EO frequency combs may be generated using an optical resonator to increase the nonlinear EO interaction strength. FIG. 8 illustrates a canonical resonator-based EO frequency comb generator 800, a continuous-wave laser 802 is coupled to a bulk nonlinear crystal resonator 804 containing an EO phase modulator 806, and comb lines are generated solely through the $\chi(2)$ process in EO phase modulator 806. When the modulation frequency matches a harmonic of the resonator free spectral range (FSR), the optical sidebands generated by EO phase modulator 806 are resonant. As illustrated in FIG. 9, in a low-loss resonator, the light passes through the modulator many times before being dissipated or coupled out, efficiently generating many comb lines 900 spaced at modulation frequency with a free spectral range (FSR) 902. As illustrated in FIG. 9, a microwave signal, with modulation frequency equal to FSR 902 of the optical resonator, couples light between different resonator modes. As a result, the input-coupled continuous-wave light is modulated, giving rise to sidebands at the modulation frequency, which may be recirculated to be modulated again. The modulation index determines the strength of coupling between nearby frequency components after passing through the modulator.

Figure 10:
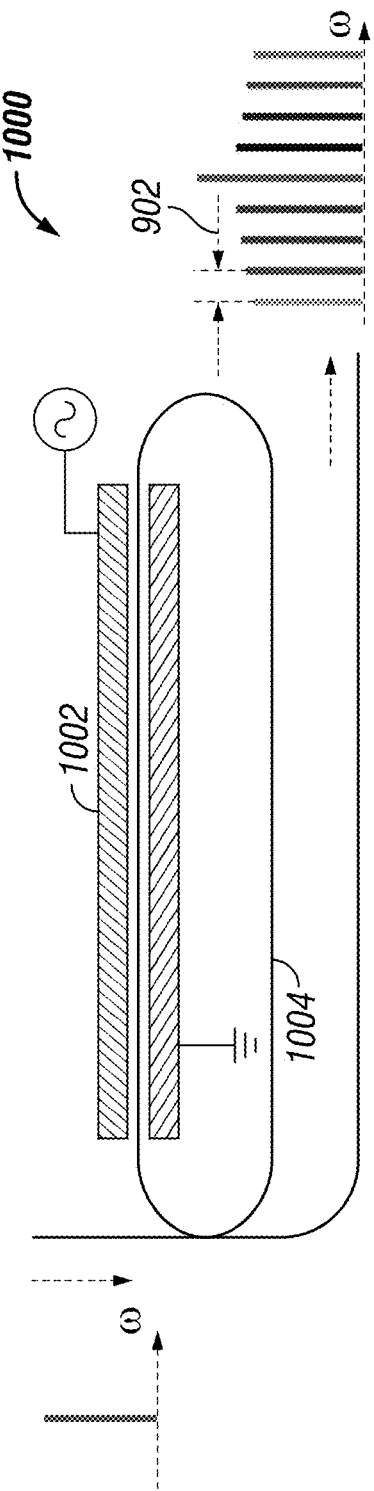
FIG. 10 is an example of an integrated microring electro-optic comb generator.

FIG. 10 further illustrates an integrated microring EO frequency comb generator 1000. As illustrated, a Fabry-Pérot resonator may be replaced by a microring resonator 1002 that is EO-modulated at a frequency matching FSR 902 of ring 1004. Similarly, to the Fabry-Pérot resonator, a continuous-wave laser coupled into microring resonator 1002 is converted to a frequency comb in the output optical waveguide. In examples, the output from current EO frequency comb generator 800 may be predicted accurately by closed-form solutions with spacings equal to the modulation frequency. The overall flatness of the comb strongly depends on the round-trip modulation strength and the optical resonator loss. In particular, at frequencies away from the pump frequency, the comb line power decreases exponentially. For example, the optical power in the qth comb line is:

$$P_q \propto e^{-\frac{|q|l}{\beta}} \quad (1)$$

where $$\beta = \frac{V_p}{V_\pi} \quad (2)$$

is the phase modulation index, Vp is the microwave drive peak amplitude, $V_\pi$ is the half-wave voltage of the phase modulator $$l = \frac{2\pi k}{FSR} \quad (3)$$

where FSR is the free spectral range and the round-trip power loss coefficient of a resonator with damping rate of $$k = \frac{\omega_0}{Q} \quad (4)$$

Q is the resonator quality factor, and $\omega_0$ is the optical frequency. Phase modulation (large $\beta$) and a high-Q optical resonator (small l) generate a flat and broad EO frequency comb generators 800. Furthermore, dispersion sets a fundamental limit on the total frequency comb bandwidth by introducing frequency-dependent phase shifts that cause comb lines far from the pump frequency to fall out of resonance. Currently, EO frequency comb generator 800 generated by FSRs 902 or fiber-based optical cavities may include practical frequency comb widths limited to a few tens of nanometers by a combination of weak modulation and limited dispersion engineering. Monolithically integrating an EO frequency comb generator 800 (e.g., referring to FIG. 8) with a microring resonator 1002 (e.g. referring to FIG. 10) on a thin-film lithium niobate nanophotonic platform may increase the frequency comb widths by two orders of magnitude.

FIG. 11 illustrates a microring resonator 1002 that includes a fabricated lithium niobate microring resonator which includes optical waveguides 1100 and metallic microelectrodes 1102. Without limitation, metallic microelectrodes 1102 may be any suitable material, for example, gold, copper, and/or the like. Metallic microelectrodes 1102 may be configured so that the phase shifts on the two sides of the microresonator are opposite, which is required to break the symmetry of different azimuthal order optical modes, enabling efficient frequency conversion. FIG. 12A illustrates a measured output spectrum of EO frequency comb generator 800 (e.g., referring to FIG. 8) with microring resonator 1002 (e.g., referring to FIG. 10), demonstrating a bandwidth exceeding 80 nm and more than 900 comb lines with a slope of 1 dB nm−1. The input optical power is 2 mW and the microwave peak driving amplitude is Vp=10 V. As illustrated, the signal-to-noise ratio of the comb lines exceeds 40 dB but is limited by the noise floor and resolution of the optical spectrum analyzer. FIG. 12 B illustrates a magnified view of several comb lines, with a line-to-line power variation of about 0.1 dB. FIG. 12 C illustrates a measured transmission spectrum for several different modulation indices $\beta$. When the modulation is turned on, the optical resonance is broadened by twice the modulation index. By leveraging the large $\chi(2)$ nonlinearity, strong microwave and optical field overlap, and ultralow-loss optical waveguides enabled by this platform, integrated EO frequency combs 800 increases performance over currently constructed frequency combs.

In examples, EO frequency comb generator 800 (e.g., referring to FIG. 8) may include over nine hundred unique frequencies spaced by 10.453 GHz, spanning 80 nm over part of the telecommunication C-band, the entire L-band and part of the U-band. Additionally, EO frequency comb generator 800 uses a low-loss lithium niobate microring resonator 1002 (e.g., referring to FIG. 10) with loaded Q 1.5 million, which is integrated with microwave electrodes for efficient phase modulation via the strong second-order nonlinearity of lithium niobate ($r_{33}$=30 pm V−1). Additionally, the tight confinement of the light (waveguide width, 1.4 µm) allows for metallic microelectrodes 1102 (e.g., referring to FIG. 11) to be placed only 3.3 µm away from the edge of the microring resonator 1002, resulting in efficient microwave delivery to achieve strong phase modulation while not affecting the resonator Q factor. The two metallic microelectrodes 1102 (i.e., microwave electrodes) may be driven so that the top and bottom sections of microring resonator 1002 experience opposite phase shifts, enabling phase matching between the microwave and the circulating optical field. With continued reference to FIG. 12A, microring resonator 1002 may be modulated by an external microwave synthesizer with peak voltage Vp=10 V (β=1.2π) at a frequency near the resonator FSR 902 (e.g., referring got FIG. 9), and the generated frequency comb spectrum. The frequency comb spectrum has a slope of about 1 dB nm−1, corresponding to power variation of less than 0.1 dB between adjacent comb lines. The comb lines have a signal-to-noise ratio of greater than 40 dB near the pump frequency, where the measurement is limited by the noise floor and the bandwidth of the optical spectrum analyzer of resolution 20 µm.

A traditional EO frequency comb span is limited to a narrow width by a combination of weak microwave modulation strength and native material dispersion, which hinders the constructive interference needed for cascaded frequency conversion to generate comb lines far from the pump frequency. In contrast, as discussed above, integrated EO frequency comb generators feature large modulation strength and the ability to engineer dispersion, which enables broader EO comb generation. The limitations of current EO frequency combs may be found in the resonance condition for the qth comb line at optical frequency $\omega_q$. In a traditional resonator, the round-trip constructive interference condition is $$q|\Delta\phi_q| < \frac{l}{2} \quad (5)$$

where $$\Delta\phi_q = \omega_q T - 2\pi N \quad (6)$$

is the accumulated roundtrip phase, T is the round-trip time and N is the number of optical cycles per round-trip (chosen to minimize $|\Delta\phi_q|$). For optical frequencies that satisfy this condition, the optical field interferes constructively within the resonator. When the resonator length is modulated, as in an EO comb generator 800 (e.g., referring to FIG. 8), the resonance condition is modified into a dynamic one, where constructive interference occurs periodically at the microwave modulation frequency $\omega_m$ inside the resonator is:

$$|\Delta\phi_q + \beta\sin\omega_m t| < \frac{l}{2} \quad (7)$$

Any frequency that does not satisfy this dynamic resonance condition may halt the frequency conversion process, thus limiting the comb width. This condition is reflected in the measured transmission spectrum of a microring resonator 1002 (e.g., referring to FIG. 10) under microwave modulation. With no microwave modulation (β≈0), the transmission spectrum exhibits a Lorentzian shape. By contrast, when the electrodes are strongly modulated (large β), the half-width at half-maximum of the transmission spectrum broadened by a factor of approximately β, confirming that the tolerable absolute accumulated phase |Δφ|q is increased to β. Thus, the strong phase modulation achieved by an integrated EO frequency comb generator allows for the continued cascade of phase modulation even in the presence of dispersion.

Figure 13:
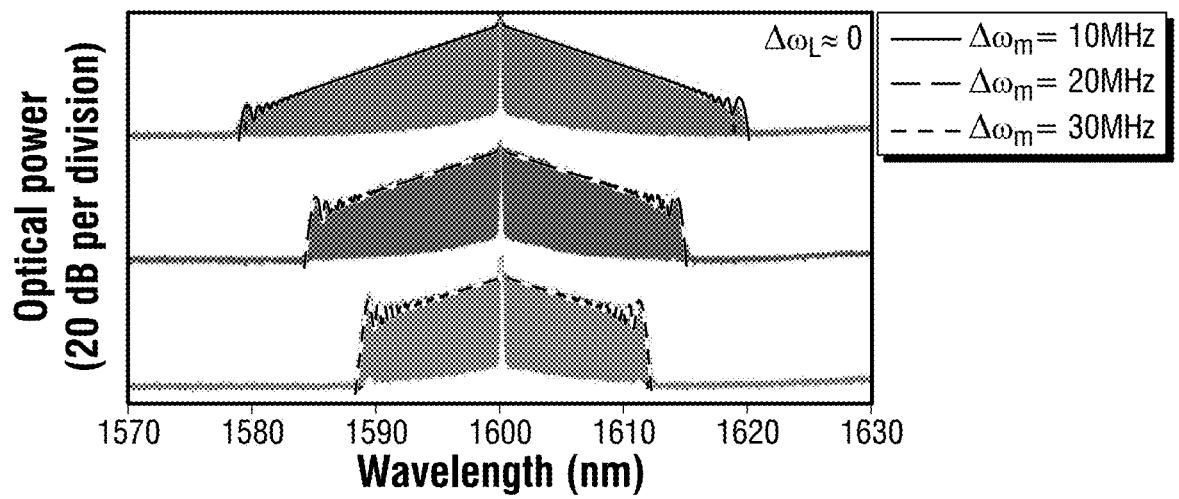
FIG. 13 is a graph of measured electro-optic comb output spectrum.
Figure 14A:
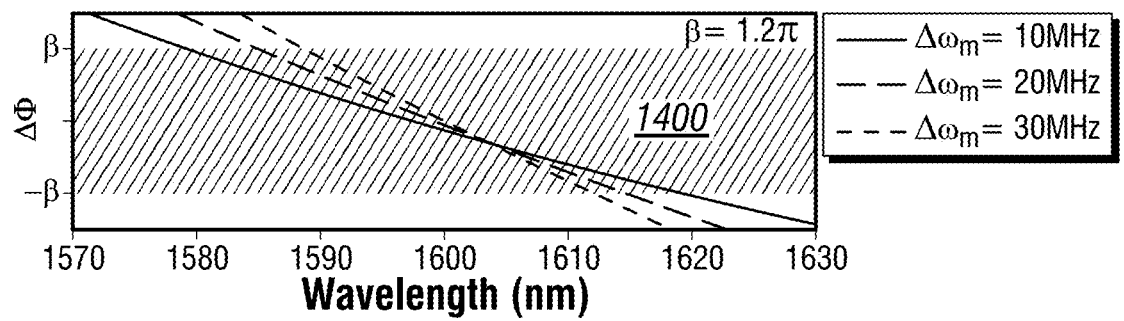
FIG. 14A is a graph of a calculated round-trip phase versus wavelength.
Figure 14B:
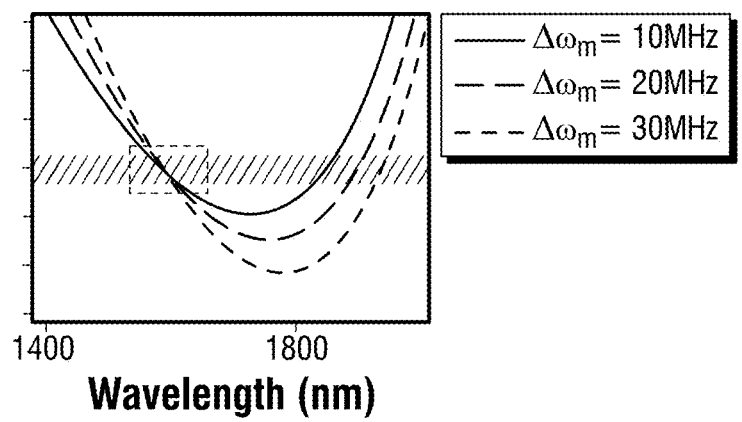
FIG. 14B is another graph of the calculated round-trip versus wavelength.

FIG. 13 illustrates a graph of a measured EO comb output spectrum for various values of modulation frequency detuning from the resonator free spectral range (Acorn). Numerical simulation of the comb envelopes matches the measured spectra. To verify the round-trip phase model experimentally, optical and microwave frequencies may be detuned to generate different comb shapes and widths. FIG. 14A illustrates a calculated round-trip phase Δφ versus wavelength for the modulation frequency detuning values shown in FIG. 13. Region 1400 highlights the constructive interference condition region beyond which EO comb generation is suppressed. This region is bounded by ±β, the round-trip modulation index. FIG. 14B is a graph of a zoomed-out view of the round-trip phase versus wavelength. The calculated cut-off frequency match with experimental data, as shown by FIGS. 13, 14A, and 14B.

Figure 15:
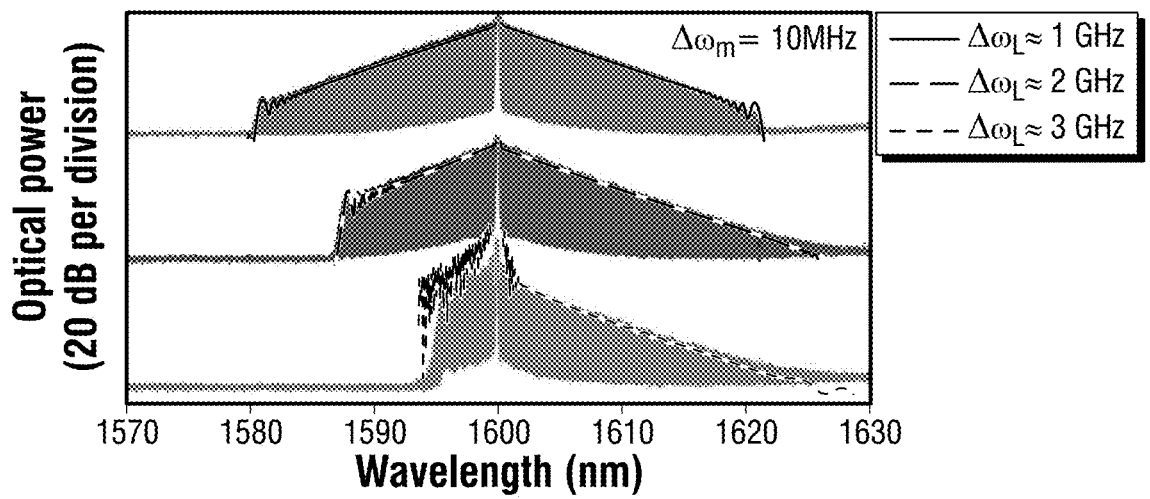
FIG. 15 is a graph of a measured comb spectrum and round-trip phase.
Figure 16A:
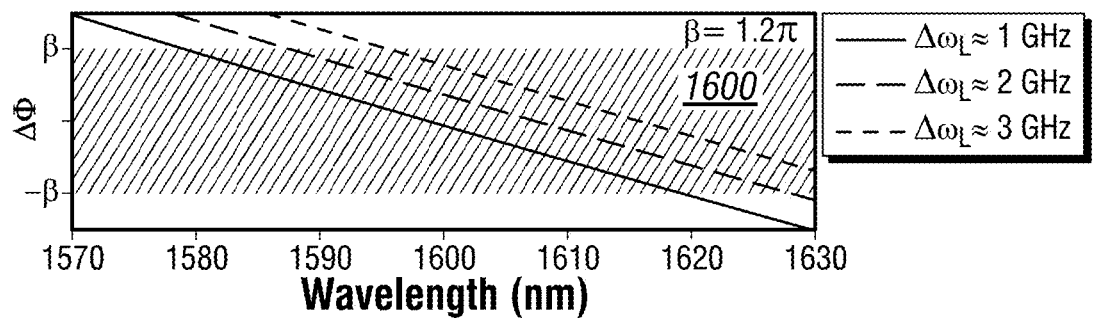
FIG. 16A is a graph of a simulated comb spectrum and round-trip phase.
Figure 16B:
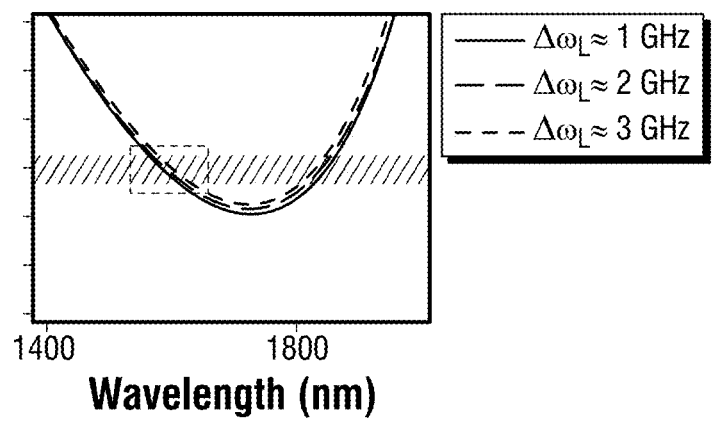
FIG. 16B is another graph of the simulated comb spectrum and round-trip phase.

FIGS. 15, 16A, and 16B are graphs illustrating a measured and simulated comb spectrum and round-trip phase versus wavelength in the presence of both optical (ΔωL) and microwave detuning. This may allow for different comb shapes, such as a single-sided EO comb, to be generated. Region 1600 in FIG. 16A highlights the constructive interference condition region beyond which EO comb generation is suppressed. By increasing the microwave detuning up to 30 MHz, a substantial reduction in the comb frequency span, which is predicted by the round-trip phase model. Any frequency components having total accumulated phases larger than β cannot resonate, thus limiting the integrated EO frequency comb bandwidth. Taking advantage of this well understood dynamic resonance condition, asymmetric combs may be generated by appropriately choosing the optical and microwave detuning. EO combs driven off resonance, such as this one, could be used as low-noise sources for optical communications owing to the noise-filtering properties of the optical resonator.

Figure 17:
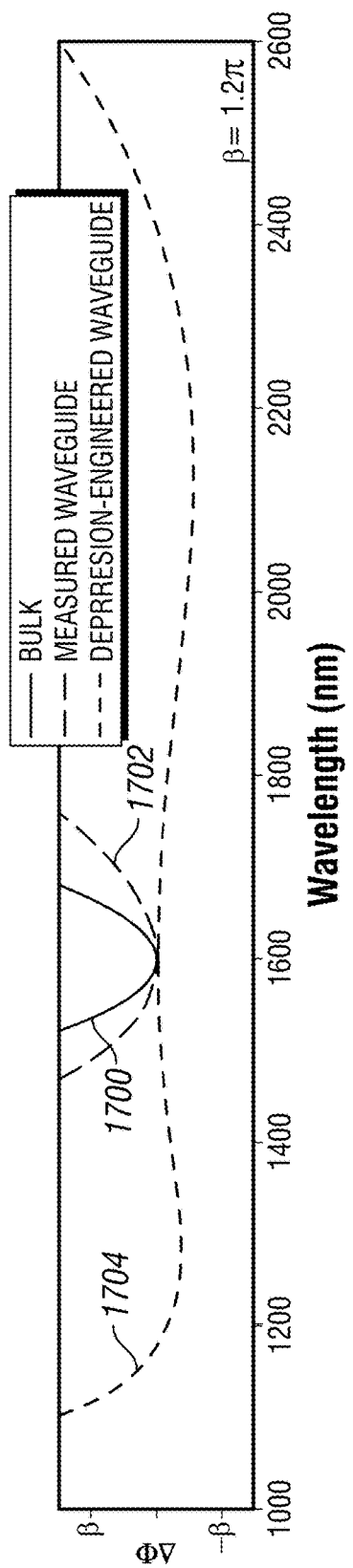
FIG. 17 is a graph of a simulated round-trip phase versus wavelength for a bulk device.

FIG. 17 illustrates a graph of a simulated round-trip phase versus wavelength for traditional bulk devices 1700, the measured integrated device 1702, and dispersion-engineered integrated devices 1706. The simulations demonstrate that integrated EO combs may achieve larger dispersion limited bandwidths than devices based on bulk crystals and dispersion engineering may enable octave spanning EO combs. The ability to engineer the dispersion of integrated EO comb generators could allow achievable comb bandwidth over a full octave. Traditionally, the span of EO comb generators is restricted by the dispersion of bulk materials, whereas our EO comb generators tightly confine light in optical waveguides, enabling fine-tuning of dispersion. As illustrated in FIG. 17, using a higher microwave modulation frequency of 50 GHz, a higher optical pump power (i.e., 2 mW), and a dispersion-engineered lithium niobate rib waveguide resonator that minimizes variation in FSR, it may be possible to generate an EO comb spanning over an octave.

Figure 18:
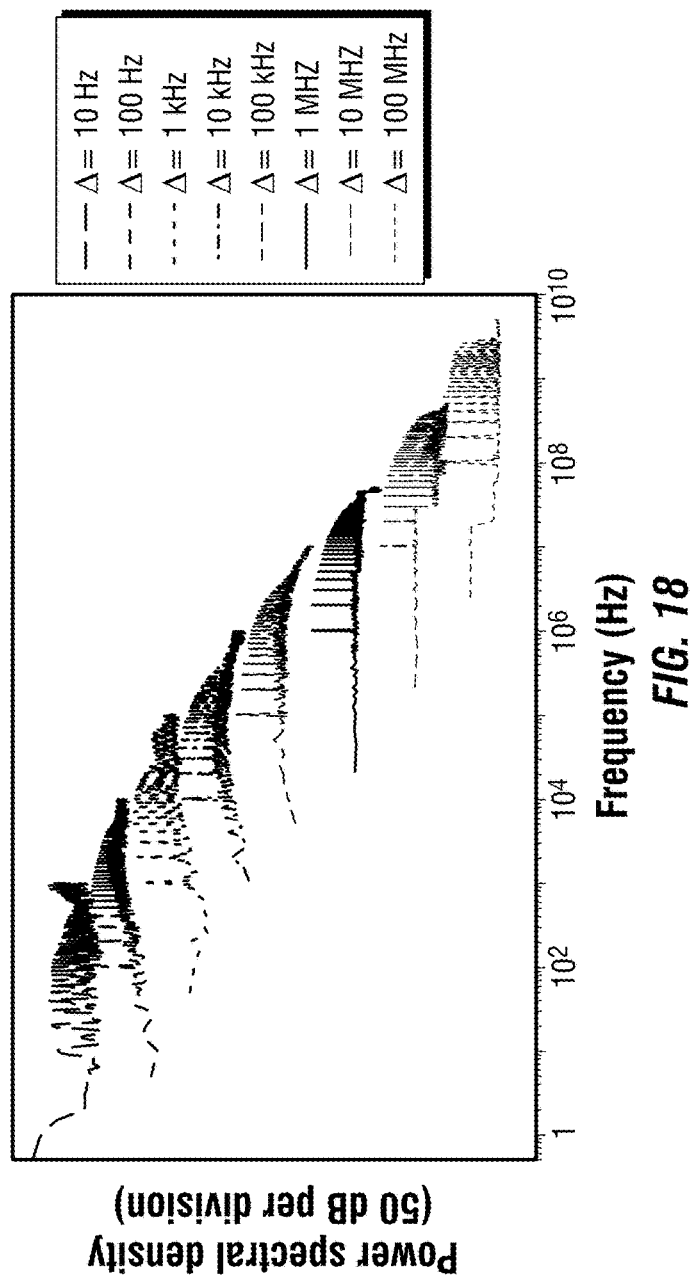
FIG. 18 is a graph of a demonstration of coherent beating of the electro-optic comb.

Without limitation, integrated EO frequency comb generators may include reliable configurability and stability. Leveraging the high tolerance to the detuning of the modulation frequency from the resonator FSR, the microresonator electrodes may be driven with two phase-locked microwave sources at various frequency offsets from 10.453 GHz, spanning over seven orders of magnitude, ranging from 10 Hz to over 100 MHz. The EO frequency comb generator is optically pumped close to zero detuning at a resonance near 1,600 nm and the output of EO frequency comb generator is then connected to a high-speed photodetector, allowing observation of coherent beating between comb lines. FIG. 18 illustrates a graph demonstrating coherent beating of the EO frequency comb. The measured beat-note power spectral density is shown on a logarithmic scale to highlight the flexibility in the control of the EO frequency comb spacing over seven orders of magnitude, from 10 Hz to 100 MHz.

Figure 19:
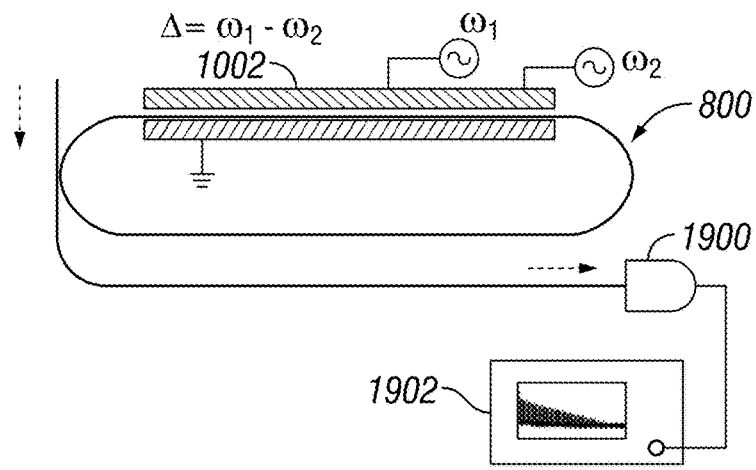
FIG. 19 is a simulated setup of the electro-optic comb.
Figure 20:
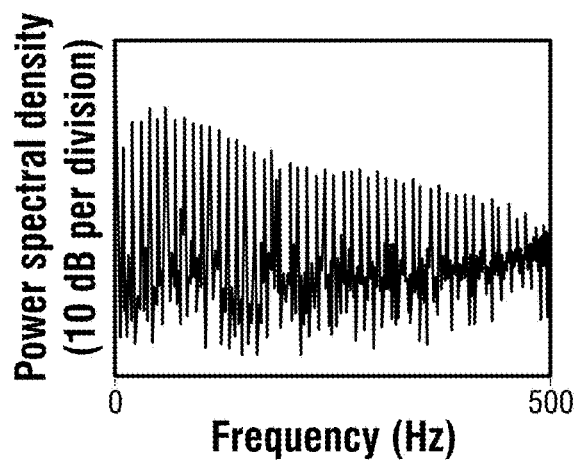
FIG. 20-23 are graphs of magnification of individual beat notes for various comb spacings.
Figure 21:
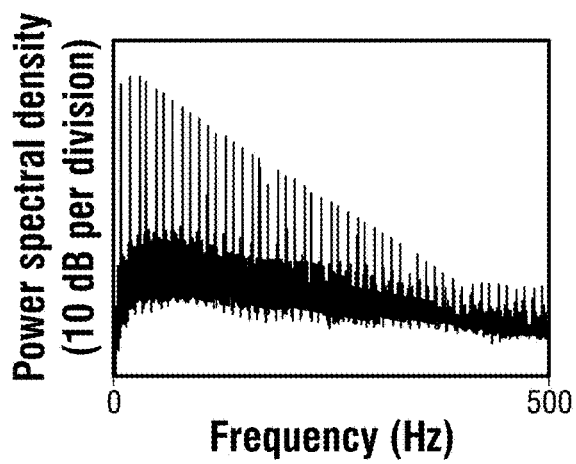
Figure 22:
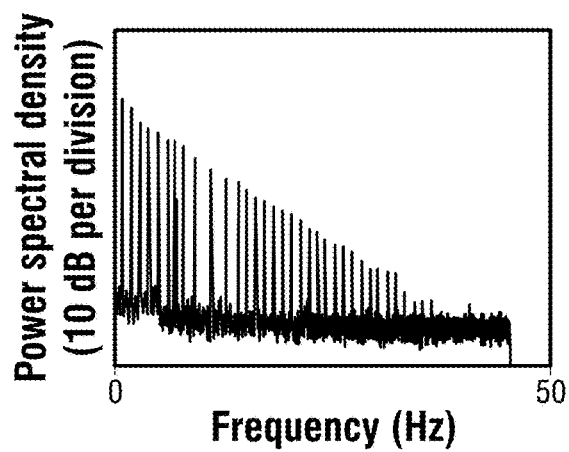
Figure 23:
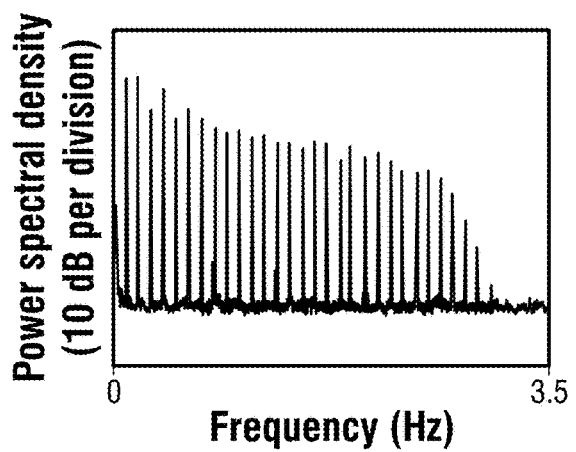

FIG. 19 illustrates an EO frequency comb generator 800 driven by a superposition of two phase-locked microwave signals, within microring resonator 1002, with various values of frequency offset. The optical output is detected by a fast photodiode 1900, and the beat notes are detected by a radio-frequency spectrum analyzer 1902. It should be noted that an optical receiver may be used in place of fast photodiode 1900. FIGS. 20-23 illustrates the magnification of the individual beat notes for various comb spacings on a linear frequency scale. This measurement, which demonstrates frequency components well beyond the resonator bandwidth in the absence of modulation, confirms that phase modulation changes the resonance condition to tolerate large microwave detuning. Additionally, this measurement demonstrates the extreme flexibility in comb frequency spacing for practical applications such as dual-comb spectroscopy or comb-based ranging.

In examples, strong phase modulation may allow for a dual-driven EO frequency comb to include frequency components far beyond the ring resonator linewidth without modulation (120 MHz). The ability to vary the frequency detuning of resonator-based EO frequency combs over seven orders of magnitude is in stark contrast with Kerr-based combs, whose frequency offset is predetermined by the fabricated resonator dimensions. This flexibility in EO frequency comb drive frequencies may enable applications requiring a reconfigurable dynamic range, such as dual-comb-based optical ranging and spectroscopy. Two independent microresonators may be integrated onto the same lithium niobate chip with high fabrication tolerance to avoid potential aliasing of the comb lines.

Improvements over current technology may be used to realize EO frequency combs over the entire lithium niobate transparency window, including the visible and near-infrared portions of the spectrum, simultaneously. With the added ability to integrate filters and resonators adjacent to or inside EO frequency comb generators on the same chip, the comb line power and hence the signal-to-noise ratio can be further increased by nearly 20 dB. This may allow for complex EO circuits to be integrated on the same chip and thus has the potential to transform microresonator frequency comb applications. For example, high-performance EO combs featuring high power and flat combs could enable terabit-per-second optical communications links that rely on stable, low-noise combs as sources for high-capacity wavelength-division multiplexed systems on a single chip. Furthermore, the EO comb generator demonstrated in this work provides many stable coherent optical frequencies with electrically adjustable frequency spacing, paving the way for efficient dual-comb spectroscopy on a chip or highly reconfigurable comb-based ranging. The preceding description provides various examples of the systems and methods of use disclosed herein which may contain different method steps and alternative combinations of components.

Statement 1: A method may comprise operating an electro-optic (EO) frequency comb with two phase-locked microwave signals to produce an optical output, detecting the optical output with an optical receiver as one or more beat notes, and detecting the one or more beat notes with a radio-frequency spectrum analyzer.

Statement 2: The method of Statement 1, further comprising adjusting an amplitude of the EO frequency comb.

Statement 3. The method of statements 1 or 2, further comprising adjusting a shape of a waveform based at least in part on a degraded fiber or a temperature change.

Statement 4. The method of statements 1-3, further comprising adjusting the EO frequency comb from a C-band to a L-band.

Statement 5. The method of statements 1-4, wherein each of the one or more beat notes have a different type of telemetry modulation.

Statement 6. The method of statements 1-5, further comprising adjusting a frequency of the EO frequency comb.

Statement 7. A method may comprise operating an electro-optic (EO) frequency comb with two phase-locked microwave signals to produce an optical output. The EO frequency comb may comprise a continuous-wave laser, a bulk nonlinear crystal resonator connected to the continuous-wave laser, an EO phase modulator disposed in the bulk nonlinear crystal resonator, and a microring resonator connected to the EO frequency comb. The method may further comprise adjusting one of two phase-locked microwave signals.

Statement 8. The method of statement 7, further comprising adjusting an amplitude of the EO frequency comb.

Statement 9. The method of statements 7 or 8, further comprising adjusting a shape of a waveform based at least in part on a degraded fiber or a temperature change.

Statement 10. The method of statements 7-9, further comprising adjusting the EO frequency comb from a C-band to a L-band.

Statement 11. The method of statements 7-10, wherein the optical output is one or more beat notes that have a different telemetry modulation for each of the one or more beat notes.

Statement 12. The method of statements 7-11, further comprising adjusting a frequency of the EO frequency comb.

Statement 13. The method of statements 7-12, wherein the microring resonator includes one or more optical wave guides disposed within one or more metallic microelectrodes.

Statement 14. A system may comprise an electro-optic (EO) frequency comb that may comprise a continuous-wave laser, a bulk nonlinear crystal resonator connected to the continuous-wave laser. The system may further comprise an EO phase modulator disposed in the bulk nonlinear crystal resonator.

Statement 15. The system of statement 14, further comprising a microring resonator connected to the EO frequency comb.

Statement 16. The system of statement 15, further comprising one or more optical wave guides disposed within one or more metallic microelectrodes.

Statement 17. The system of statement 16, wherein the microring resonator is configured to create a frequency offset.

Statement 18. The system of statement 14, further comprising an optical receiver connected to a microring resonator which is connected to the EO frequency comb.

Statement 19. The system of statement 18, further comprising a radio-frequency spectrum analyzer connected to the optical receiver and configured to detect one or more beat notes.

Statement 20. The system of statement 19, further comprising one or more phase-locked microwave sources that are connected to the microring resonator.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
  operating an electro-optic (EO) frequency comb with two phase-locked microwave signals to produce an optical output, wherein the EO frequency comb comprises;
    a continuous-wave laser;
    a bulk nonlinear crystal resonator connected to the continuous-wave laser;
    an EO phase modulator disposed in the bulk nonlinear crystal resonator; and
    a microring resonator connected to the EO frequency comb; and
  adjusting one of two phase-locked microwave signals; and
  adjusting the shape of the EO frequency comb based at least in part on a downhole temperature change.

2. The method of claim 1, further comprising adjusting an amplitude of the EO frequency comb.

3. The method of claim 1, further comprising adjusting the shape of a the EO frequency comb based at least in part on a degraded fiber.

4. The method of claim 1, further comprising adjusting the EO frequency comb from a C-band to a L-band.

5. The method of claim 1, wherein the optical output is one or more beat notes that have a different telemetry modulation for each of the one or more beat notes.

6. The method of claim 1, further comprising adjusting a frequency of the EO frequency comb.

7. The method of claim 1, wherein the microring resonator includes one or more optical wave guides disposed within one or more metallic microelectrodes.

8. The method of claim 1, wherein the continuous-wave laser provides a carrier offset frequency.

9. The method of claim 8, wherein the carrier offset frequency corresponds to a frequency less than the comb tooth spacing of the EO frequency comb.

10. The method of claim 1, wherein the EO phase modulator further comprises a wavelength division multiplexer, an encoder, or a demultiplexer.

11. A system comprising:
  an electro-optic (EO) frequency comb comprising:
    a continuous-wave laser;
    a bulk nonlinear crystal resonator connected to the continuous-wave laser;
    an EO phase modulator disposed in the bulk nonlinear crystal resonator; and
  an information handling system for adjusting a shape of the EO frequency comb based at least in part on a downhole temperature change.

12. The system of claim 11, further comprising a microring resonator connected to the EO frequency comb.

13. The system of claim 12, further comprising one or more optical wave guides disposed within one or more metallic microelectrodes.

14. The system of claim 13, wherein the microring resonator is configured to create a frequency offset.

15. The system of claim 11, further comprising an optical receiver connected to a microring resonator which is connected to the EO frequency comb.

16. The system of claim 15, further comprising a radio-frequency spectrum analyzer connected to the optical receiver and configured to detect one or more beat notes.

17. The system of claim 16, further comprising one or more phase-locked microwave sources that are connected to the microring resonator.

18. The system of claim 11, wherein the continuous-wave laser provides a carrier offset frequency.

19. The system of claim 18, wherein the carrier offset frequency corresponds to a frequency less than the comb tooth spacing of the EO frequency comb.

20. The system of claim 11, wherein the EO phase modulator further comprises a wavelength division multiplexer, an encoder, or a demultiplexer.

* * * * *

UNITED STATES PATENT AND TRADEMARK OFFICE
CERTIFICATE OF CORRECTION

PATENT NO. : 11,506,953 B2
APPLICATION NO. : 16/671150
DATED : November 22, 2022
INVENTOR(S) : Daniel Joshua Stark It is certified that error appears in the above-identified patent and that said Letters Patent is hereby corrected as shown below:

In the Specification

Column 14, Line 3 please replace "Acorn" with --$\Delta\omega m$--.

Signed and Sealed this
Seventeenth Day of January, 2023

Katherine Kelly Vidal
*Director of the United States Patent and Trademark Office*